(12) United States Patent
Lai et al.

(10) Patent No.: US 9,578,706 B1
(45) Date of Patent: Feb. 21, 2017

(54) SELF-ADJUSTING POWER SUPPLY CIRCUIT OF SILICON CONTROLLED DIMMING IN LED LIGHTING

(71) Applicants: Lianzhang Lai, Shanghai (CN); Muhong Wang, Shanghai (CN); Jifeng Tao, Shanghai (CN); Zhonghua Sun, Shanghai (CN); Weilin Chen, Shanghai (CN)

(72) Inventors: Lianzhang Lai, Shanghai (CN); Muhong Wang, Shanghai (CN); Jifeng Tao, Shanghai (CN); Zhonghua Sun, Shanghai (CN); Weilin Chen, Shanghai (CN)

(*) Notice: Subject to any disclaimer, the term of this patent is extended or adjusted under 35 U.S.C. 154(b) by 0 days.

(21) Appl. No.: 15/196,027

(22) Filed: Jun. 29, 2016

(51) Int. Cl.
*G05F 1/00* (2006.01)
*H05B 37/02* (2006.01)
*H05B 39/04* (2006.01)
*H05B 41/36* (2006.01)
*H05B 33/08* (2006.01)

(52) U.S. Cl.
CPC ...... *H05B 33/0845* (2013.01); *H05B 33/0809* (2013.01)

(58) Field of Classification Search
None
See application file for complete search history.

(56) References Cited

U.S. PATENT DOCUMENTS

2013/0038229 A1* 2/2013 Kojima ............ H05B 33/0851
  315/200 R
2015/0291088 A1* 10/2015 Ueno ................ H02M 7/48
  315/77

* cited by examiner

*Primary Examiner* — Anh Tran

(57) ABSTRACT

A self-adjusting power supply circuit of silicon controlled dimming in LED lighting, having a first resistor, a second resistor, a third resistor, a first diode, a second diode, a third diode, a fourth diode, a comparator, a first invertor, a second invertor, a first field effect transistor, a second field effect transistor, a third field effect transistor, a fourth field effect transistor, a switch transistor, a fifth field effect transistor, and a parasitic capacitor; the first resistor and the first diode are connected in series; the fourth diode is connected in parallel with the first resistor and the first diode; the second resistor and the third resistor are connected in series; two pins of the first invertor are connected respectively with the comparator and the second invertor; the first field effect transistor is connected in series with the second field effect transistor and the second diode; the third field effect transistor is connected in series with the fourth field effect transistor; the third diode is connected in parallel with the fifth field effect transistor; the fifth field effect transistor is connected in parallel with the parasitic capacitor; the fifth field effect transistor is connected in series with the switch transistor.

9 Claims, 4 Drawing Sheets

SELF-ADJUSTING POWER SUPPLY CIRCUIT OF SILICON CONTROLLED DIMMING IN LED LIGHTING

BACKGROUND OF THE INVENTION

The present invention relates to a power supply circuit, and more specifically relates to a self-adjusting power supply circuit of silicon controlled dimming in LED lighting.

Silicon controlled dimming is a lighting adjustment method commonly applied to incandescent lights and energy-saving lights. In recent years, due to the developments of LED lighting technology, silicon controlled dimming technology is also applied to LED lights, and now widely applied to technical fields such as household and commercial lightings. FIG. 2 schematically illustrates a circuit diagram of silicon controlled dimming in LED lighting. V0 represents AC mains voltage, which is generally 220 VAC or 120 VAC; reference number 310 represents a silicon controlled dimmer; reference 311 represents a rectifier bridge; reference number 312 represents buck switching power supply; and reference 313 represents a load which is an LED light. When the complete AC mains voltage is chopped by the silicon controlled dimmer, a broken AC waveform is formed; after rectification, the broken waveform supplies power to the buck switching power supply 312. The more broken the waveform is, the dimmer the LED light becomes.

FIGS. 3a to 3c disclose waveforms of the voltage at two ends of a capacitor CHV after rectification. An initial wave form 110 represents a complete AC mains voltage waveform, which is a waveform of a sinusoidal waveform after rectification, and this waveform corresponds to the situation where the dimmer is not connected. A third waveform 113 represents a chopped wave chopped by the silicon controlled dimmer 310 and an output waveform rectified by the rectifier bridge 311. An area enclosed by a first waveform 111, a second waveform 112 and the time axis represents the chopped parts chopped by the dimmer. The larger this area is (the more the second waveform 112 shifts to the right), the larger the parts having zero electrical level are, and correspondingly, the dimmer the LED light will become. A fourth waveform 114 represents a waveform with the largest parts being chopped off when the dimming effect of the dimmer is set at the greatest degree. According to the fourth waveform 114, most parts have zero electrical level, and only a very small portion of the waveform is left with non-zero electrical level. In such situation, power supply becomes a very difficult condition to maintain when electrical level is zero for most of the time. If power supply is insufficient, the drive chip will restart and the LED light will flash as a result. However, flashing of the LED light is not preferred.

As noted above, power supply is a very important technical issue in a silicon controlled dimming circuit. Some of the existing power supply technologies are described as follows. In a first existing power supply technology as shown in FIG. 4, Vi represents a voltage of a first end capacitor CHV1; Vi is connected with a VCC terminal via an eleventh resistor R11 to directly supply power to the drive circuit. The greatest disadvantage of this technology is that the eleventh resistor R11 has to allow current of small enough voltage to pass through so as to allow power supply even under the voltage represented by the fourth waveform 114 shown in FIG. 3c, but when the waveform is near to its full cycle, power consumption will be enormously high (wasted through direct grounding of a first clamp tube Z1), and there is a great loss of efficiency. This technology is therefore rarely used since people nowadays attach more and more importance to efficiency. This first existing power supply technology uses components such as a tenth resistor R10, the eleventh resistor R11, a twelfth resistor R12, the first clamp tube Z1, a fifth capacitor C5, a third diode D3 and a sixth capacitor C6.

FIG. 5 shows a second existing power supply technology according to which a junction gate field-effect transistor (JFET) J10 is integrated inside the drive chip to directly supply power to the VCC terminal. This technology effectively solves the dilemma between power supply and efficiency. However, its greatest disadvantage is that the drive chip has to be designed in accordance with high-voltage BCD. High-voltage BCD has a much higher cost and the space required by each component is larger. Another deadly disadvantage is that, under high-voltage BCD, ESD of the JFET is not good, and thus resulting in easy damage of chip pins and lowered overall product yield rate along with complaints from the customers. This second existing power supply technology uses components such as the JFET J10, a sixteenth resistor R16, a seventeenth resistor R17, an eighteenth resistor R18, an eighth capacitor C8, a ninth capacitor C9 and a fifth diode D5.

FIG. 6 shows a third existing power supply technology according to which the drive chip is designed in accordance with ordinary prior arts, and a power supply network comprising a tenth secondary winding L10, an eleventh secondary winding L11, a twelfth diode D12, a fourth capacitor C4 and a ninth resistor R9 is formed to supply power to the VCC terminal. This technology solves the problems of the first two technologies described above, and therefore being widely used nowadays. This technology also uses a second clamp diode Z2, a seventh resistor R7, a third capacitor C3, a sixth resistor R6 and a second capacitor C2.

FIG. 7 shows a fourth existing power supply technology to be used in a switching power supply having a floating ground structure (a variation of the third existing power supply technology), where one less winding is being used. In other words, a power supply network formed by a fourteenth diode D14, a seventh capacitor C7 and a fifteenth resistor R15 supplies power to the VCC terminal. This technology also uses a tenth resistor R10, an initial capacitor C0, a first capacitor C1, a thirteenth resistor R13, a twelfth diode D10 and a third clamp diode Z3.

The third and the fourth existing power supply technologies are widely used power supply technologies nowadays. The third one having a common ground structure (FIG. 6) has disadvantages of requiring additional windings and a network formed by high-voltage diode, high-voltage capacitors and resistors for power supply. The fourth one having a floating ground structure (FIG. 7) does not require any secondary windings, but it still requires components such as high-voltage diodes, high-voltage capacitors and resistors. The large quantity of components increases the cost and complicates the wire arrangement on a PCB. In actual use, it is discovered that in order to adapt to different dimmers, RC network has to be more complicated to solve the problem of power supply. Besides, as shown in FIGS. 6-7, the second clamp diode Z2 and the third clamp diode Z3 are used for consuming the extra power at the VCC terminal, thereby increasing power consumption and lowering efficiency.

BRIEF SUMMARY OF THE INVENTION

The technical solution provided by the present invention is a self-adjusting power supply circuit of silicon controlled dimming in LED lighting. The present invention is suitable for high degree of integration and the making of integrated circuit. The present invention has a very good manufacturability with simple peripheral configurations. It has low manufacturing cost, high power supply efficiency and little wastage.

The present invention has the following technical solution: A self-adjusting power supply circuit of silicon controlled dimming in LED lighting, comprising a first resistor, a second resistor, a third resistor, a first diode, a second diode, a third diode, a fourth diode, a comparator, a first invertor, a second invertor, a first field effect transistor, a second field effect transistor, a third field effect transistor, a fourth field effect transistor, a switch transistor, a fifth field effect transistor, and a parasitic capacitor. The first resistor and the first diode are connected in series. The fourth diode is connected in parallel with the first resistor and the first diode. The first resistor is connected in parallel with the second resistor. The second resistor and the third resistor are connected in series. The second resistor and the third resistor are connected with an input end of the comparator. Two pins of the first invertor are connected respectively with an output end of the comparator and the second invertor. A source of the first field effect transistor is connected with a source of the second field effect transistor. A drain of the first field effect transistor is connected with the second diode. A source of the third field effect transistor is connected with a source of the fourth field effect transistor. The third field effect transistor is connected with the second invertor. A drain of the fourth field effect transistor is connected with a gate of the fifth field effect transistor. A gate of the first field effect transistor is connected with the first resistor. The third diode is connected with the fifth field effect transistor. A source and a drain of the fifth field effect transistor are connected respectively with two ends of the parasitic capacitor. The source of the fifth field effect transistor is connected with the switch transistor.

Preferably, the self-adjusting power supply circuit of silicon controlled dimming in LED lighting also comprises a VCC1 terminal, a VCC2 terminal, a D terminal, an S terminal and a GND terminal. The fourth diode is provided between the VCC1 terminal and the GND terminal. The fourth diode is a clamping diode. The clamping diode absorbs extra voltage power of the VCC1 terminal.

Preferably, the fifth field effect transistor, the switch transistor and the clamping diode form a source drive circuit, it is because a gate voltage of the fifth field effect transistor is fixed; an electrical level of the source of the fifth field effect transistor determines whether the fifth field effect transistor is switched on or off. When the switch transistor is switched off, the electrical level at the source of the fifth field effect transistor will rise and eventually resulting in the fifth field effect transistor being switched off. When the switch transistor is switched on, the electrical level at the source of the fifth field effect transistor will drop to zero, and thus resulting in the fifth field effect transistor being switched on and connected.

Preferably, the second field effect transistor and the third field effect transistor are P-type field effect transistors. The first field effect transistor and the fourth field effect transistor are N-type field effect transistors.

Preferably, the first resistor and the first diode form an internal power supply circuit to mainly supply power to the VCC2 terminal through the first field effect transistor and the fourth field effect transistor.

Preferably, the second resistor and the third resistor are both sensing resistors for sensing a voltage of the VCC1 terminal.

Preferably, the third diode is a rectifier diode.

Preferably, the first resistor provides bias current to the first diode. A clamping voltage formed by the first diode provides biasing effect to the first field effect transistor and the fourth field effect transistor. The second transistor and the third transistor are both voltage divider resistors for sensing a voltage at the VCC1 terminal. The second diode is used for supplying power to the VCC2 terminal in a single direction, and block current backflow from the VCC2 terminal to achieve rectification. The third diode is used for clamping of an SW terminal. When voltage of the D terminal rises, voltage of the D terminal will charge the SW terminal through the parasitic capacitor to increase the voltage of the SW terminal. The third diode provides a channel from the third diode to the fourth field effect transistor and to the GND, to provide voltage clamping of the SW terminal. The fourth field effect transistor is used for clamping voltage of the VCC1 terminal. The comparator determines voltage of the VCC1 terminal, and chooses to switch on the second field effect transistor or the third field effect transistor via the first invertor and the second invertor. The second field effect transistor and the third field effect transistor are both switch transistors for use to choose whether the VCC2 terminal should be charged through a channel along the second diode and the first field effect transistor, or whether the VCC2 terminal should be charged through the fourth field effect transistor.

Preferably, the fourth diode is connected in parallel with a first power supply capacitor and a second power supply capacitor.

The present invention has the following progressive effects: The present invention is suitable for high degree of integration and the making of integrated circuit. The present invention has a very good manufacturability with simple peripheral configurations. It has low manufacturing cost, high power supply efficiency and little wastage.

DETAILED DESCRIPTION OF THE INVENTION

A preferred embodiment of the present invention is described below to explain in detail the technical solution of the present invention.

Figure 1:
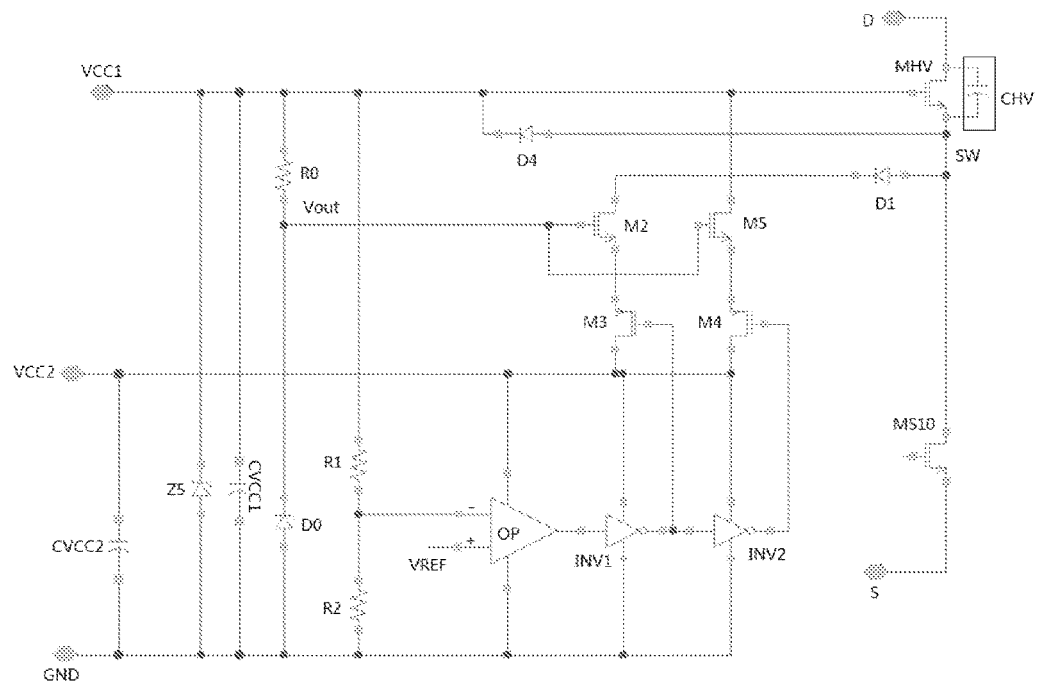
FIG. 1 is a detailed circuit diagram of a self-adjusting power supply circuit of silicon controlled dimming in LED lighting according to the present invention.
Figure 2:
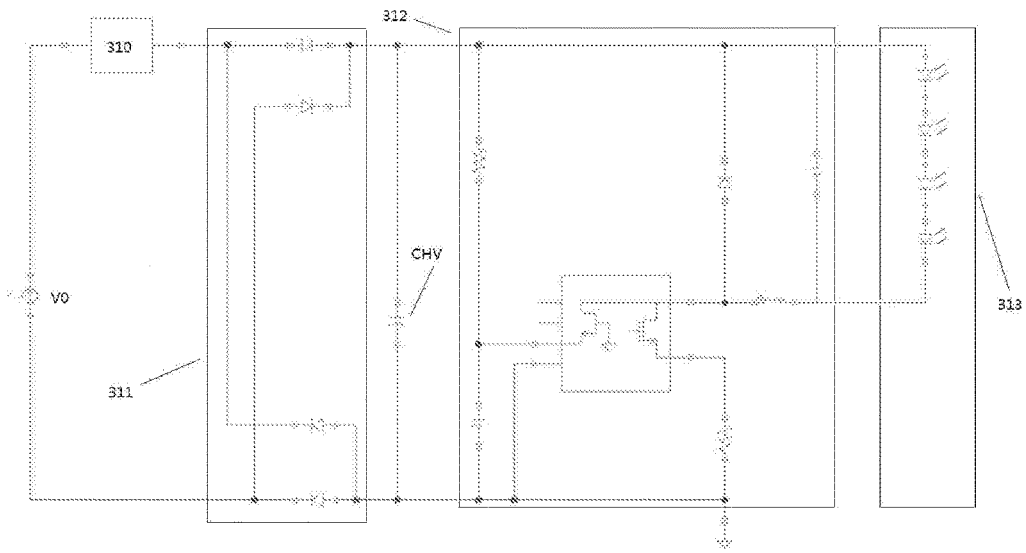
FIG. 2 schematically illustrates a circuit diagram of silicon controlled dimming in LED lighting according to prior arts.

As shown in FIG. 1, a self-adjusting power supply circuit of silicon controlled dimming in LED lighting according to the present invention comprises a first resistor R0, a second resistor R1, a third resistor R2, a first diode D0, a second diode D1, a third diode D4, a fourth diode Z5, a comparator OP, a first invertor INV1, a second invertor INV2, a first field effect transistor M2, a second field effect transistor M3, a third field effect transistor M4, a fourth field effect transistor M5, a switch transistor MS10, a fifth field effect transistor MHV, and a parasitic capacitor CHV. The first resistor R0 and the first diode D0 are connected in series. The fourth diode Z5 is connected in parallel with the first resistor R0 and the first diode D0. The first resistor R0 is connected in parallel with the second resistor R1. The second resistor R1 and the third resistor R2 are connected in series. The second resistor R1 and the third resistor R2 are connected with an input end of the comparator OP. Two pins of the first invertor INV1 are connected respectively with an output end of the comparator OP and the second invertor INV2. A source of the first field effect transistor M2 is connected with a source of the second field effect transistor M3. A drain of the first field effect transistor M2 is connected with the second diode D1. A source of the third field effect transistor M4 is connected with a source of the fourth field effect transistor M5. The third field effect transistor M4 is connected with the second invertor INV2. A drain of the fourth field effect transistor M5 is connected with a gate of the fifth field effect transistor MHV. A gate of the first field effect transistor M2 is connected with the first resistor R0. The third diode D4 is connected with the fifth field effect transistor MHV. A source and a drain of the fifth field effect transistor MHV are connected respectively with two ends of the parasitic capacitor CHV. The source of the fifth field effect transistor MHV is connected with the switch transistor MS10. The switch transistor MS10 is a MOS transistor. The fifth field effect transistor MHV is a high voltage transistor. The fourth diode Z5 is connected in parallel with a first power supply capacitor CVCC1 and a second power supply capacitor CVCC2.

The first resistor R0 provides bias current to the first diode D0. A clamping voltage formed by the first diode D0 provides biasing effect to the first field effect transistor M2 and the fourth field effect transistor M5. The second transistor R1 and the third transistor R2 are both voltage divider resistors for sensing voltage at the VCC1 terminal. The second diode D1 is used for supplying power to VCC2 terminal in a single direction, and block current backflow from the VCC2 terminal to achieve rectification. The third diode D4 is used for clamping of SW terminal. When voltage of D terminal (drain terminal) rises, voltage of the D terminal will charge the SW terminal through the parasitic capacitor CHV to increase the voltage of the SW terminal. If the voltage of the SW terminal is too high that exceeds a withstand voltage of a drain terminal of the switch transistor MS10, the switch transistor MS10 will be burnt. Therefore, the third diode D4 provides a channel from the third diode D4 to the fourth field effect transistor Z5 and to GND, to provide voltage clamping of the SW terminal. The fourth field effect transistor Z5 is used for clamping voltage of VCC1 terminal. The comparator OP determines voltage of the VCC1 terminal, and chooses to switch on the second field effect transistor M3 or the third field effect transistor M4 via the first invertor INV1 and the second invertor INV2. The second field effect transistor M3 and the third field effect transistor M4 are both switch transistors for use to choose whether VCC2 terminal should be charged through a channel along the second diode D1 and the first field effect transistor M2, or whether the VCC2 terminal should be charged through the fourth field effect transistor M5. When the VCC1 terminal has a relatively high voltage, and the following formula (1) is satisfied:

$$VCC1*(R2/(R1+R2)) > VREF \qquad (1)$$

VCC1 is used to directly refer to a voltage of the VCC1 terminal, the first invertor INV1 has an output of a high electrical level, the second field effect transistor M3 is switched off, the second invertor INV2 has an output of a low electrical level, and the third field effect transistor M4 is switched on. The voltage of the VCC1 terminal charges the VCC2 terminal through the fourth field effect transistor M5 and the third field effect transistor M4. VREF represents a reference voltage.

Alternatively, if the following formula (2) is satisfied:

$$VCC1*(R2/(R1+R2)) < VREF \qquad (2)$$

the first invertor INV1 has an output of a low electrical level, the second field effect transistor M3 is switched on, the second invertor INV2 has an output of a high electrical level, and the third field effect transistor M4 is switched off.

Voltage of the D terminal charges the VCC2 terminal through the fifth field effect transistor MHV (or the parasitic capacitor CHV), the second diode D1, the first field effect transistor M2 and the second field effect transistor M3. The switch transistor MS10 is a low transistor switch; the switch transistor and the fifth field effect transistor MHV together form a switch transistor of the switching power supply. When the switch transistor MS10 is switched on, voltage of the SW terminal falls, and the fifth field effect transistor MHV will also be switched on. CHV is the parasitic capacitor of the fifth field effect transistor MHV. The fifth field effect transistor MHV is a 500V high voltage power field effect transistor with a view to lowering the cost.

The self-adjusting power supply circuit of silicon controlled dimming in LED lighting also comprises VCC1 terminal, VCC2 terminal, D terminal, S terminal and GND terminal. The fourth diode Z5 is provided between the VCC1 terminal and the GND terminal. The fourth diode Z5 is a clamping diode. The clamping diode absorbs extra voltage power of the VCC1 terminal. VCC1 terminal represents a first power supplying source terminal. VCC2 terminal represents a second power supplying source terminal. D terminal represents a drain terminal of the fifth field effect transistor. S terminal represents a source terminal of the switch transistor, and GND terminal represents a grounded terminal.

The fifth field effect transistor, the switch transistor and the clamping diode form a source drive circuit, it is because a gate voltage of the fifth field effect transistor is fixed; the electrical level of the source of the fifth field effect transistor determines whether the fifth field effect transistor is switched on or off. When the switch transistor is switched off, the electrical level at the source will rise and eventually resulting in the fifth field effect transistor being switched off. When the switch transistor is switched on, the electrical level at the source will drop to zero, and thus resulting in the fifth field effect transistor being switched on and connected.

The second field effect transistor and the third field effect transistor are P-type field effect transistors. The first field effect transistor and the fourth field effect transistor are N-type field effect transistors. Accordingly, cost is kept low.

The first resistor and the first diode form an internal power supply circuit with a major purpose of supply power to the VCC2 terminal through the first field effect transistor and the fourth field effect transistor. A low voltage linear voltage regulator can also be alternatively configured.

The second resistor and the third resistor are both sensing resistors for sensing voltage of the VCC1 terminal.

The third diode is a rectifier diode. The third diode has a single-direction electrical conductivity; in other words, when voltage of the SW terminal is higher than voltage of the VCC1 terminal, voltage of the SW terminal charges the VCC1 terminal; however, when voltage of the SW terminal is lower than voltage of the VCC1 terminal, voltage of the VCC1 terminal will not charge the SW terminal. Therefore, charge leakage at the VCC1 terminal can be avoided.

The circuit diagram of the above given embodiment of the present invention comprises two power supplying methods. The two methods are as follows:

Method (a): The third diode being a rectifier diode; the third diode and the parasitic capacitor form a charge pump circuit to supply power; after the high voltage square wave clock of the D terminal has been rectified by the third diode, power is supplied to the VCC1 terminal.

Method (b): A circuit formed by the fifth field effect transistor, the second diode and the first field effect transistor supplies power directly, and being controlled by the second field effect transistor.

Figure 3A:
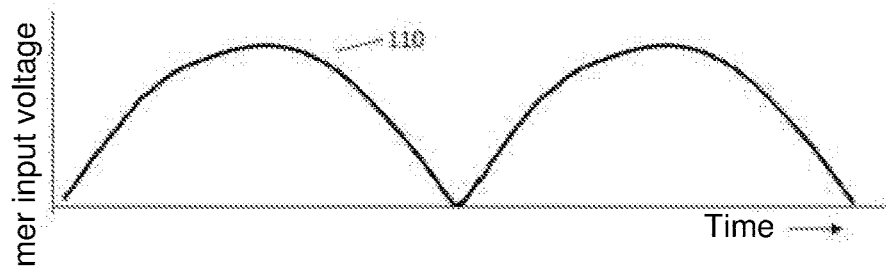
FIGS. 3a to 3c illustrate waveforms of the voltage at two ends of a capacitor after rectification in a self-adjusting power supply circuit of silicon controlled dimming in LED lighting according to prior arts; a vertical axis of FIG. 3a represents dimmer input voltage; a vertical axis of FIG. 3b represents capacitor CHV voltage; a vertical axis of FIG. 3c also represents capacitor CHV voltage.
Figure 3B:
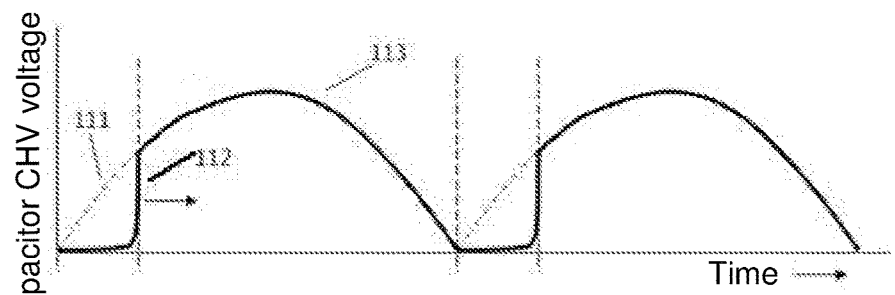
Figure 3C:
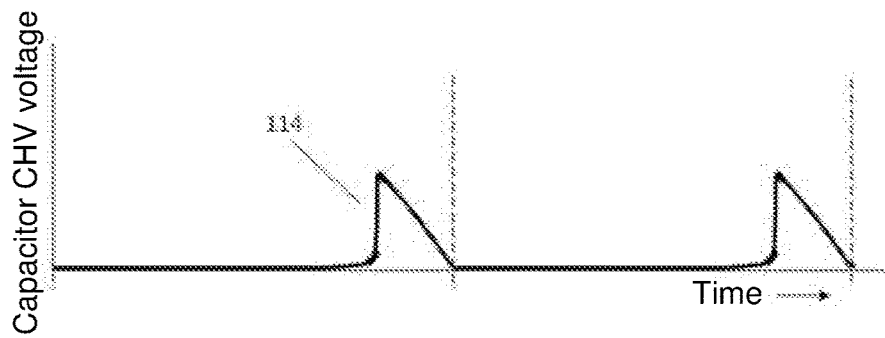
Figure 4:
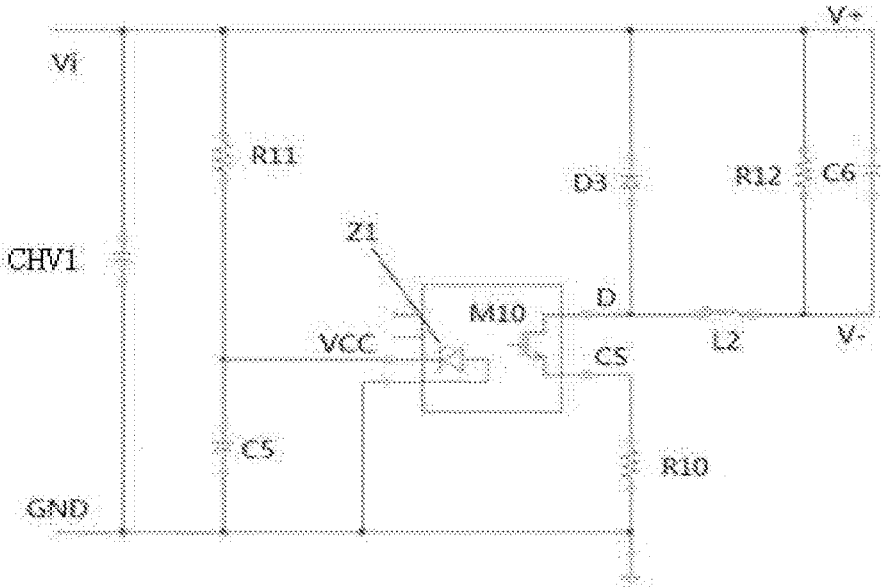
FIG. 4 is a circuit diagram of a first power supply technology according to prior arts.

Method (a) is a unique feature of a source drive circuit. If power is not directed to the VCC1 terminal, it must be absorbed by other circuits, otherwise the source voltage will be too high and thus burn the switch transistor. However, this method (a) may still be too weak and cannot meet the requirements for silicon controlled dimming, especially when the dimming effect of the dimmer is adjusted to the greatest degree and hence the output power signals at most of the times have only zero electrical level (the fourth waveform 114 in FIG. 3c). Method (b) provides power supply directly through the fifth field effect transistor and therefore has a very strong power supplying ability.

The principle of the present invention is that, when the power supplying circuit provided by method (a) cannot meet the requirements for power supply, power supplying method is switched to a channel supplying method (method (b)). Power supply in accordance with this principle satisfies the stringent power supplying requirements for silicon controlled dimming and achieves very good power supplying efficiency. The reasons are explained below:

1. The method (a) described above for power supply is a collateral feature of a circuit. Even if power is not stored up by a first power supply capacitor CVCC1, the power must be absorbed by some other components. As shown in FIG. 1, the power is stored up by the first power supply capacitor CVCC1 according to the present invention. When the voltage of the VCC1 terminal is relatively high, the power being stored up will be directed to the VCC2 terminal and then being used.

2. The VCC2 terminal is a main power supply source; most parts of the chip's circuit receive power supply therefrom. When power supply is very sufficient by means of method (a), the power of the VCC2 terminal come from the power supplied according to method (a). When power supply is insufficient by means of method (a), the power of the VCC2 terminal will be supplied according to method (b) which has a very strong power supplying ability.

Figure 5:
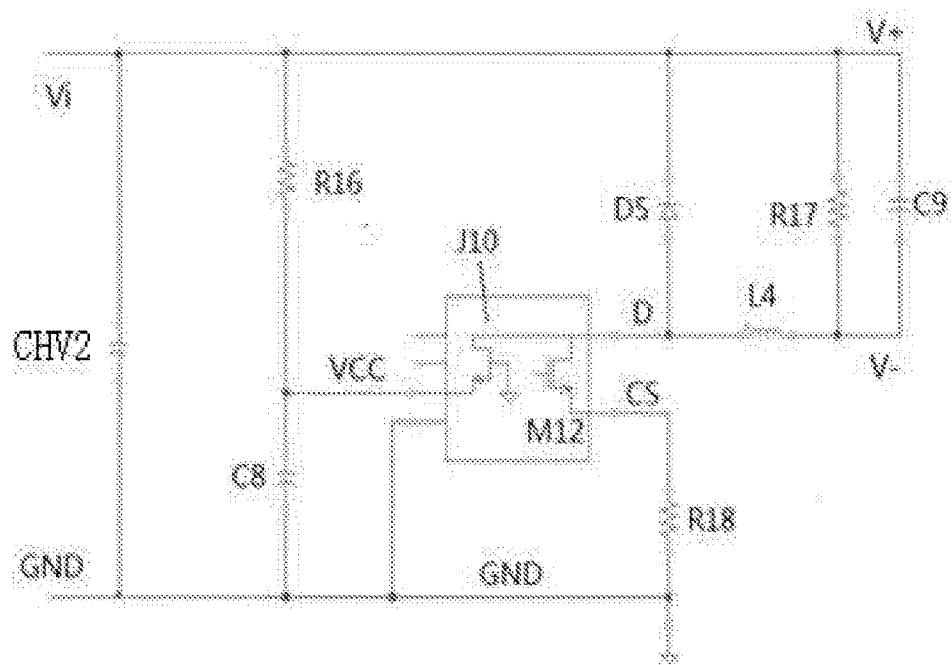
FIG. 5 is a circuit diagram of a second power supply technology according to prior arts.
Figure 6:
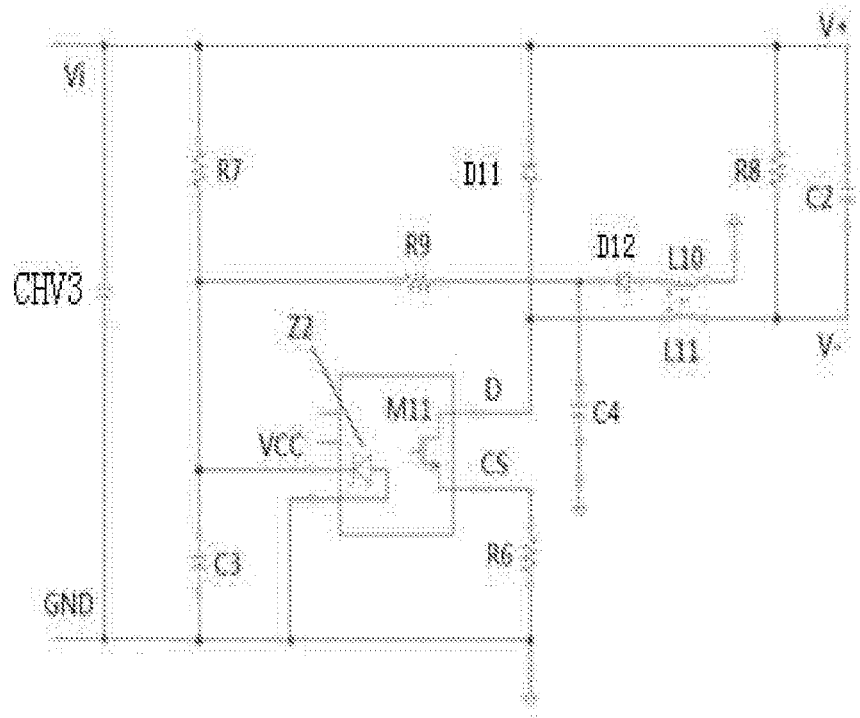
FIG. 6 is a circuit diagram of a third power supply technology according to prior arts.
Figure 7:
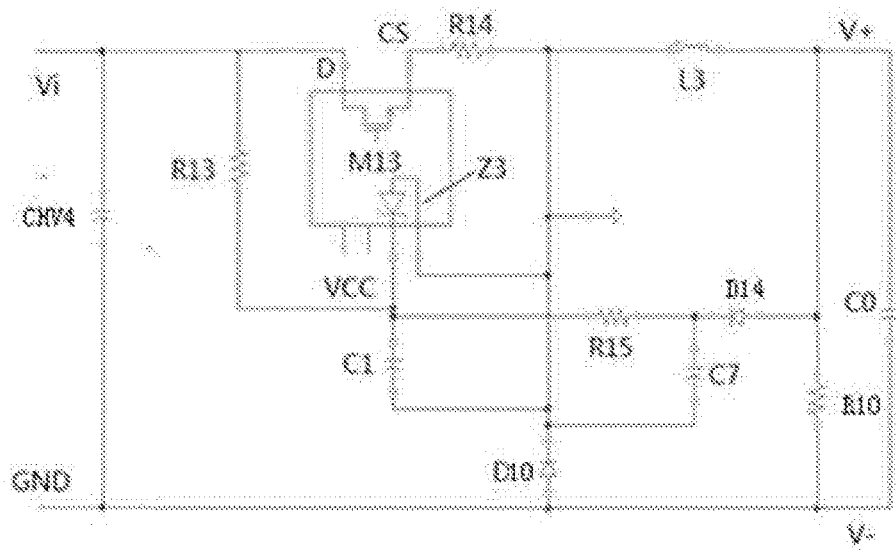
FIG. 7 is a circuit diagram of a fourth power supply technology according to prior arts.

In actual use, a start-up resistor is set to allow high voltage current to pass through in order to start up the chip. As such, only a very small amount of power will be wasted by the resistor, thereby improving the overall efficiency. When source drive power is significantly great, such power is used for supplying power and will not be wasted, thereby improving the overall efficiency as well. If these two conditions still fail to meet the power supply requirements, the method for supplying power will be switched to method (b). Power supplying method according to method (b) has the characteristics that the power obtained by the chip IC from the VCC2 terminal is exactly the same amount as the power supplied according to method (b). Therefore, there will be no undue wastage of power, thereby significantly improving efficiency. Accordingly, power supply similar to FIG. 5 can be achieved, but the entire circuit is attained by low voltage configurations, thereby possessing good manufacturability.

The working principle of the present invention is described in detail below with reference to FIG. 1: When the VCC1 terminal has stored up enough power and the voltage is high enough, and the second resistor and the third resistor have divider voltage greater than VREF, and the comparator has an output of zero electrical level, and the first invertor has an output of "1" and the second field effect transistor is switched off, while the second invertor has an output of "0" and the third field effect transistor is switched on and connected, the VCC1 terminal supplies power to the VCC2 terminal through the fourth field effect transistor and the third field effect transistor. When the capacitor at the VCC1 terminal does not store up enough power for power supply and the VCC1 terminal has a relatively low voltage, the comparator has an output of "1", the third field effect transistor is switched off and the second field effect transistor is switched on and connected; the first field effect transistor then supplies power to the VCC2 terminal via the connected second field effect transistor.

As described above, the present invention is a highly efficient self-adjusting power supply technology that makes use of low voltage configurations to meet the stringent power supplying requirements for silicon controlled dimming. The present invention has the following advantages:

1. Except for the fifth field effect transistor as shown in FIG. 1, other components are low voltage components. The present invention is very suitable for high degree of integration and the making of integrated circuit. The present invention has very good manufacturability and its peripheral configurations are very simple.

2. High degree of integration of low voltage configurations can keep the overall cost low. Firstly, it is because the components can have a small size without the need of high voltage configurations; even though FIG. 1 has shown many components, areas occupied by wafers required to be manufactured are in fact very small. Secondly, due to high degree of integration, implementation is simple and does not require secondary windings and additional power supply networks, thereby very cost-saving. These two factors together can significantly lower the overall cost.

3. Self-adjusting power supply technology is efficient. It is because power wastage at the start-up resistor is not an issue because the present invention does not rely on the start-up resistor to supply power. Also, as the major VCC2 terminal does not require clamp tube, no extra power will be wasted. Further, by using source drive mechanism, parasitic capacitor of a high voltage power tube may act as charge pump to provide a certain flow of electrical current to the chip, and the loss at the switch of the high voltage power tube is also significantly reduced. In summary, the power supplying technology of the present invention has a very high power supplying efficiency.

The above described embodiment is a detailed illustration of the technical problems solved by the present invention, the technical solution offered by the present invention and the beneficial effects of the present invention. It should be noted that the above description is intended to only describe a detailed embodiment of the present invention, and therefore should not be considered limiting. Any changes, modification and replacement achieving equivalent technical effects, made within the essence and principle of the present invention, should also fall within the scope of protection of the present invention.

What is claimed is:

1. A self-adjusting power supply circuit of silicon controlled dimming in LED lighting, comprising a first resistor, a second resistor, a third resistor, a first diode, a second diode, a third diode, a fourth diode, a comparator, a first invertor, a second invertor, a first field effect transistor, a second field effect transistor, a third field effect transistor, a fourth field effect transistor, a switch transistor, a fifth field effect transistor, and a parasitic capacitor; the first resistor and the first diode are connected in series; the fourth diode is connected in parallel with the first resistor and the first diode; the first resistor is connected in parallel with the second resistor; the second resistor and the third resistor are connected in series; the second resistor and the third resistor are connected with an input end of the comparator; two pins of the first invertor are connected respectively with an output end of the comparator and the second invertor; a source of the first field effect transistor is connected with a source of the second field effect transistor; a drain of the first field effect transistor is connected with the second diode; a source of the third field effect transistor is connected with a source of the fourth field effect transistor; the third field effect transistor is connected with the second invertor; a drain of the fourth field effect transistor is connected with a gate of the fifth field effect transistor; a gate of the first field effect transistor is connected with the first resistor; the third diode is connected with the fifth field effect transistor; a source and a drain of the fifth field effect transistor are connected respectively with two ends of the parasitic capacitor; the source of the fifth field effect transistor is connected with the switch transistor.

2. The self-adjusting power supply circuit of silicon controlled dimming in LED lighting as in claim 1, wherein the self-adjusting power supply circuit of silicon controlled dimming in LED lighting also comprises a VCC1 terminal, a VCC2 terminal, a D terminal, an S terminal and a GND terminal; the fourth diode is provided between the VCC1 terminal and the GND terminal; the fourth diode is a clamping diode; the clamping diode absorbs extra voltage power of the VCC1 terminal.

3. The self-adjusting power supply circuit of silicon controlled dimming in LED lighting as in claim 2, wherein the fifth field effect transistor, the switch transistor and the clamping diode form a source drive circuit; since a gate voltage of the fifth field effect transistor is fixed, an electrical level of the source of the fifth field effect transistor determines whether the fifth field effect transistor is switched on or off; when the switch transistor is switched off, the electrical level at the source of the fifth field effect transistor will rise and eventually resulting in the fifth field effect transistor being switched off; when the switch transistor is switched on, the electrical level at the source of the fifth field effect transistor will drop to zero, and thus resulting in the fifth field effect transistor being switched on and connected.

4. The self-adjusting power supply circuit of silicon controlled dimming in LED lighting as in claim 2, wherein the second field effect transistor and the third field effect transistor are P-type field effect transistors; the first field effect transistor and the fourth field effect transistor are N-type field effect transistors.

5. The self-adjusting power supply circuit of silicon controlled dimming in LED lighting as in claim 2, wherein the first resistor and the first diode form an internal power supply circuit to mainly supply power to the VCC2 terminal through the first field effect transistor and the fourth field effect transistor.

6. The self-adjusting power supply circuit of silicon controlled dimming in LED lighting as in claim 2, wherein the second resistor and the third resistor are both sensing resistors for sensing a voltage of the VCC1 terminal.

7. The self-adjusting power supply circuit of silicon controlled dimming in LED lighting as in claim 2, wherein the third diode is a rectifier diode.

8. The self-adjusting power supply circuit of silicon controlled dimming in LED lighting as in claim 2, wherein the first resistor provides bias current to the first diode; a clamping voltage formed by the first diode provides biasing effect to the first field effect transistor and the fourth field effect transistor; the second transistor and the third transistor are both voltage divider resistors for sensing a voltage at the VCC1 terminal; the second diode is used for supplying power to the VCC2 terminal in a single direction, and block current backflow from the VCC2 terminal to achieve rectification; the third diode is used for clamping of an SW terminal; when voltage of the D terminal rises, voltage of the D terminal will charge the SW terminal through the parasitic capacitor to increase the voltage of the SW terminal; the third diode provides a channel from the third diode to the fourth field effect transistor and to the GND, to provide voltage clamping of the SW terminal; the fourth field effect transistor is used for clamping voltage of the VCC1 terminal; the comparator determines voltage of the VCC1 terminal, and chooses to switch on the second field effect transistor or the third field effect transistor via the first invertor and the second invertor; the second field effect transistor and the third field effect transistor are both switch transistors for use to choose whether the VCC2 terminal should be charged through a channel along the second diode and the first field effect transistor, or whether the VCC2 terminal should be charged through the fourth field effect transistor.

9. The self-adjusting power supply circuit of silicon controlled dimming in LED lighting as in claim 1, wherein the fourth diode is connected in parallel with a first power supply capacitor and a second power supply capacitor.

* * * * *